US012159568B2

(12) United States Patent
Liu

(10) Patent No.: US 12,159,568 B2
(45) Date of Patent: Dec. 3, 2024

(54) PIXEL DRIVING CIRCUIT AND DRIVING METHOD THEREOF, AND DISPLAY PANEL

(71) Applicants: HUIZHOU CHINA STAR OPTOELECTRONICS DISPLAY CO., LTD., Guangdong (CN); TCL CHINA STAR OPTOELECTRONICS TECHNOLOGY CO., LTD., Guangdong (CN)

(72) Inventor: Bin Liu, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/755,827

(22) PCT Filed: Apr. 22, 2022

(86) PCT No.: PCT/CN2022/088521
§ 371 (c)(1),
(2) Date: Oct. 19, 2023

(87) PCT Pub. No.: WO2023/197361
PCT Pub. Date: Oct. 19, 2023

(65) Prior Publication Data

US 2024/0161681 A1 May 16, 2024

(30) Foreign Application Priority Data

Apr. 12, 2022 (CN) ......................... 202210378275.3

(51) Int. Cl.
*G09G 3/32* (2016.01)

(52) U.S. Cl.
CPC ....... *G09G 3/32* (2013.01); *G09G 2300/0819* (2013.01); *G09G 2300/0852* (2013.01);
(Continued)

(58) Field of Classification Search
CPC ............. G09G 3/32; G09G 2300/0819; G09G 2300/0852; G09G 2310/08;
(Continued)

(56) References Cited

U.S. PATENT DOCUMENTS

2010/0220038 A1* 9/2010 Chung ................. G09G 3/3233 345/76
2012/0327064 A1* 12/2012 Qi ......................... G09G 3/3233 345/82
(Continued)

FOREIGN PATENT DOCUMENTS

CN 106448526 A 2/2017
CN 107230451 A 10/2017
(Continued)

OTHER PUBLICATIONS

International Search Report in International application No. PCT/CN2022/088521, mailed on Nov. 29, 2022.
(Continued)

*Primary Examiner* — Hong Zhou
(74) *Attorney, Agent, or Firm* — PV IP PC; Wei Te Chung

(57) ABSTRACT

A pixel driving circuit, a driving method thereof, and a display panel are disclosed. A second transistor stores a threshold voltage of a first transistor in a first capacitor according to a second scan signal, so as to compensate an influence of the threshold voltage on a driving current. A fifth transistor makes a voltage difference between a first node and a second node irrelevant to a second voltage signal according to a fourth scan signal, so as to improve a current attenuation issue caused by a voltage drop during a signal transmission.

18 Claims, 4 Drawing Sheets

(52) U.S. Cl.
CPC . *G09G 2310/08* (2013.01); *G09G 2320/0223* (2013.01); *G09G 2320/0233* (2013.01); *G09G 2320/045* (2013.01)

(58) Field of Classification Search
CPC ... G09G 2320/0223; G09G 2320/0233; G09G 2320/045
See application file for complete search history.

(56) References Cited

U.S. PATENT DOCUMENTS

| | | | | |
|---|---|---|---|---|
| 2016/0055797 | A1* | 2/2016 | Tan | G09G 3/3258 345/206 |
| 2019/0019453 | A1* | 1/2019 | Chen | H10K 59/1213 |
| 2023/0063644 | A1* | 3/2023 | Chung | G09G 3/3233 |
| 2024/0038162 | A1* | 2/2024 | Yin | G09G 3/3233 |

FOREIGN PATENT DOCUMENTS

| | | | |
|---|---|---|---|
| CN | 108257549 | A | 7/2018 |
| CN | 109243368 | A | 1/2019 |
| CN | 112071275 | A | 12/2020 |
| IN | 106887207 | A | 6/2017 |
| KR | 20040009285 | A | 1/2004 |

OTHER PUBLICATIONS

Written Opinion of the International Search Authority in International application No. PCT/CN2022/088521, mailed on Nov. 29, 2022.

* cited by examiner

PIXEL DRIVING CIRCUIT AND DRIVING METHOD THEREOF, AND DISPLAY PANEL

FIELD OF THE DISCLOSURE

The present application relates to the field of display technologies of display panels, and more particularly, to a pixel driving circuit and a driving method thereof, and a display panel.

BACKGROUND

Display of a display panel is realized by using an active matrix driving method and a line scanning technology, an issue of transient high current can be improved. However, a transistor that drives light-emitting devices to emit light may have a threshold voltage shift under a long-term bias, such that a current flowing through the light-emitting devices may be attenuated. In addition, due to a loss of a signal during a transmission process (such as a voltage drop during the signal transmission process), the current that drives the light-emitting devices in the panel to emit light is also different, resulting in an issue of uneven display on the display panel.

SUMMARY

Technical Problem

Embodiments of the present application provide a pixel driving circuit, a driving method thereof, and a display panel, which can compensate for current attenuation caused by a threshold voltage shift and a voltage drop during a signal transmission and improve an issue of uneven display on the display panel.

Technical Solution

An embodiment of the present application provides a pixel driving circuit, where the pixel driving circuit includes a first transistor, a second transistor, a fifth transistor, a first capacitor, a second capacitor, and a light-emitting device.

A gate of the first transistor is electrically connected to a first node, one of a source and a drain of the first transistor is electrically connected to a second node, and another of the source and the drain of the first transistor is electrically connected to a third node.

A source and a drain of the second transistor are electrically connected between the first node and the third node, a gate of the second transistor is electrically connected to a second scan line and is used to detect a threshold voltage of the first transistor according to a second scan signal.

The first capacitor is connected in series between the first node and the second node; the second capacitor is connected in series between the first node and a first voltage terminal; the light-emitting device is electrically connected between the first voltage terminal and the third node.

A source and a drain of the fifth transistor are electrically connected between a second voltage terminal and the second node, and a gate of the fifth transistor is electrically connected to a fourth scan line and is used to compensate a second voltage signal according to a fourth scan signal.

Optionally, in some embodiments of the present application, the pixel driving circuit further includes a third transistor, wherein a source and a drain of the third transistor are electrically connected between a data line and the second node, and a gate of the third transistor is electrically connected to a first scan line and is used to transmit a data signal to the second node according to a first scan signal.

Optionally, in some embodiments of the present application, the pixel driving circuit further includes a fourth transistor, wherein a source and a drain of the fourth transistor are electrically connected between the second capacitor and the first voltage terminal, and a gate of the fourth transistor is electrically connected to the first scan line and is used to disconnect an electrical connection between the first voltage terminal and the second capacitor when the fifth transistor compensates the second voltage signal.

Optionally, in some embodiments of the present application, the pixel driving circuit further includes a sixth transistor, wherein a source and a drain of the sixth transistor are electrically connected between the first voltage terminal and the first node, and a gate of the sixth transistor is electrically connected to a third scan line and is used to initialize a potential of the first node according to a third scan signal.

Optionally, in some embodiments of the present application, the pixel driving circuit further includes a seventh transistor, wherein a source and a drain of the seventh transistor are electrically connected between the light-emitting device and the third node, and a gate of the seventh transistor is electrically connected to an emission line.

Optionally, in some embodiments of the present application, the pixel driving circuit further includes an eighth transistor, wherein a source and a drain of the eighth transistor are electrically connected between the second voltage terminal and the second node, and a gate of the eighth transistor is electrically connected to the emission line.

Optionally, in some embodiments of the present application, a capacitance of the first capacitor is less than or equal to a capacitance of the second capacitor.

Optionally, in some embodiments of the present application, the light-emitting device comprises an organic light-emitting diode, a sub-millimeter light-emitting diode, or a micro light-emitting diode.

Optionally, in some embodiments of the present application, the third transistor and the fourth transistor are both P-type transistors or are both N-type transistors.

Embodiments of the present application further provide a driving method of a pixel driving circuit, which is used to drive any of the above-mentioned pixel driving circuits, and the driving method includes:

A threshold voltage detection and data writing stage: the second transistor is turned on in response to the second scan signal, such that the first transistor is diode-connected.

A power supply voltage writing stage: the fifth transistor is turned on in response to the fourth scan signal, and the second voltage signal provided by the second voltage terminal is transmitted to the second node.

An embodiment of the present application further provides a display panel, the display panel includes any one of the above-mentioned pixel driving circuits and a power supply, and the power supply is electrically connected to the first voltage terminal of the pixel driving circuit.

Optionally, in some embodiments of the present application, the display panel further comprises a gate driving chip, the gate driving chip is electrically connected to the gate of the second transistor through the second scan line and is electrically connected to the gate of the fifth transistor through the fourth scan line.

Advantageous Effect

Compared with the prior art, the embodiments of the present application provide a pixel driving circuit, a driving method thereof, and a display panel. The pixel driving circuit includes a first transistor, a second transistor, a fifth transistor, a first capacitor, a second capacitor, and a light-emitting device. The first capacitor is connected in series between the gate of the first transistor and one of the source and the drain of the first transistor. The second capacitor is connected in series between the gate of the first transistor and the first voltage terminal. The second transistor is electrically connected between the gate of the first transistor and the other of the source and the drain of the first transistor. The fifth transistor is electrically connected between the second voltage terminal and one of the source and the drain of the first transistor that is electrically connected to the first capacitor. The light-emitting device is connected in series between the first voltage terminal and the other of the source and the drain of the first transistor. The second transistor stores the threshold voltage of the first transistor in the first capacitor according to the second scan signal, so as to compensate the influence of the threshold voltage on the driving current when the first transistor drives the light-emitting device to emit light. The fifth transistor makes the voltage difference between the first node and the second node irrelevant to the second voltage signal according to the fourth scan signal, so as to realize the compensation of the second voltage signal. Thereby, the issue of current attenuation caused by the voltage drop in the signal transmission process is improved, and the issue of uneven display of the display panel is improved.

DETAILED DESCRIPTION

In order to make the objectives, technical solutions, and effects of the present application clearer, the present application will be further described in detail below with reference to the accompanying drawings and examples. It should be understood that the specific embodiments described herein are only used to explain the present application, but not to limit the present application.

Figure 1A:
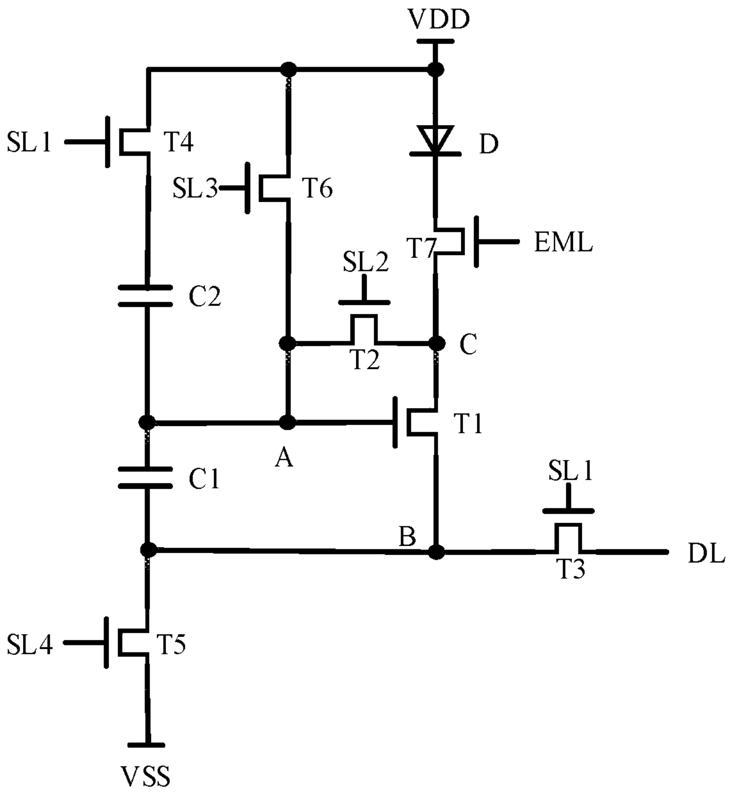
FIG. 1A and FIG. 1B are schematic structural diagrams of a pixel driving circuit provided by an embodiment of the present application.
Figure 1B:
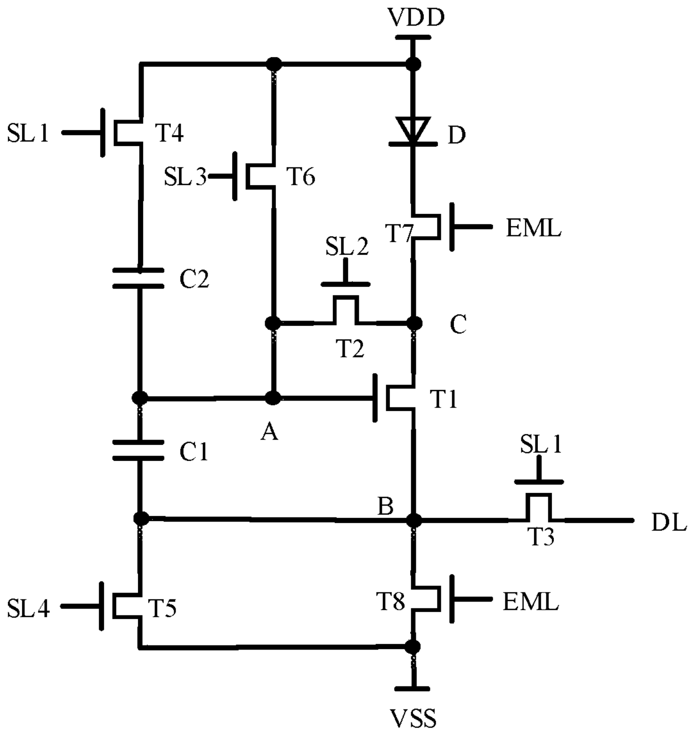

Specifically, FIG. 1A and FIG. 1B are schematic structural diagrams of a pixel driving circuit provided by an embodiment of the present application. Embodiments of the present application provide a pixel driving circuit. The pixel driving circuit includes at least one light-emitting device D, a first transistor T1, a second transistor T2, a first capacitor C1, and a second capacitor C2.

Optionally, the light-emitting device D includes at least one of organic light-emitting diodes, sub-millimeter light-emitting diodes, and micro light-emitting diodes.

Optionally, the pixel driving circuit may include one of the light-emitting devices D or may include a plurality of the light-emitting devices D. Optionally, when the pixel driving circuit includes a plurality of the light-emitting devices D, the plurality of the light-emitting devices D may be connected in series, or the plurality of the light-emitting devices D may be connected in parallel.

The first transistor T1 and the light-emitting device D are electrically connected between the first voltage terminal VDD and the second voltage terminal VSS. The first transistor T1 is used to generate a driving current Ids for driving the light-emitting device D to emit light.

Optionally, the light-emitting device D is connected in series between the first voltage terminal VDD and one of the source and the drain of the first transistor T1. Or, the light-emitting device D is connected in series between the second voltage terminal VSS and the other one of the source electrode and the drain electrode of the first transistor T1. In this application, the light-emitting device D is connected in series between the first voltage terminal VDD and one of the source and the drain of the first transistor T1 for illustration.

Specifically, the gate of the first transistor T1 is electrically connected to the first node A. One of the source and the drain of the first transistor T1 is electrically connected to the second node B. The other one of the source and the drain of the first transistor T1 is electrically connected to the third node C. The anode of the light-emitting device D is electrically connected to the first voltage terminal VDD, and the cathode of the light-emitting device D is electrically connected to the third node C. The light-emitting device D is closer to the first voltage terminal VDD, which is conducive to reducing the voltage amplitude corresponding to each transistor in the pixel driving circuit and is more conducive to reducing power consumption.

The first capacitor C1 is connected in series between the first node A and the second node B.

The second capacitor C2 is connected in series between the first node A and the first voltage terminal VDD.

Optionally, the capacitance of the first capacitor C1 is less than or equal to the capacitance of the second capacitor C2. This enables the second capacitor C2 to achieve a better voltage regulation effect on the gate potential of the first transistor T1.

The source and the drain of the second transistor T2 are electrically connected between the first node A and the third node C. The gate of the second transistor T2 is electrically connected to the second scan line SL2. The second transistor T2 is used for detecting the threshold voltage of the first transistor T1 according to the second scan signal Scan2 transmitted by the second scan line SL2. Specifically, one of the source and the drain of the second transistor T2 is electrically connected to the gate of the first transistor T1. The other one of the source and the drain of the second transistor T2 is electrically connected to the one of the source and the drain of the first transistor T1 that is electrically connected to the light-emitting device D. The second transistor T2 makes the first transistor T1 diode-connected according to the second scan signal Scan2 transmitted by the second scan line SL2. Thus, the threshold voltage of the first transistor T1 is stored in the first capacitor C1, and the data signal Data is stored in the second capacitor C2. In order to compensate the influence of the threshold voltage on the driving current Ids when the first transistor T1 drives the light emitting device D to emit light. Therefore, the issue that the driving current Ids flowing through the light-emitting device D is attenuated due to the shift of the threshold voltage of the first transistor T1 is improved.

Continue to refer to FIG. 1A and FIG. 1B, the pixel driving circuit further includes a third transistor T3. The source and the drain of the third transistor T3 are electrically connected between the data line DL and the second node B. The gate of the third transistor T3 is electrically connected to the first scan line SL1. The third transistor T3 is configured to transmit the data signal Data to the second node B according to the first scan signal Scan1 transmitted by the first scan line SL1. Specifically, one of the source and the drain of the third transistor T3 is electrically connected to the data line DL. The other one of the source and the drain of the third transistor T3 is electrically connected to the one of the source and the drain of the first transistor T1 that is electrically connected to the second voltage terminal VSS. The third transistor T3 transmits the data signal Data transmitted by the data line DL to the second node B according to the first scan signal Scan1 transmitted by the first scan line SL1.

Continue to refer to FIG. 1A and FIG. 1B, the pixel driving circuit further includes a fourth transistor T4. The source and the drain of the fourth transistor T4 are electrically connected between the second capacitor C2 and the first voltage terminal VDD. The gate of the fourth transistor T4 is electrically connected to the first scan line SL1. Specifically, one of the source and the drain of the fourth transistor T4 is electrically connected to the second capacitor C2. The other one of the source and the drain of the fourth transistor T4 is electrically connected to the first voltage terminal VDD. The fourth transistor T4 is electrically connected to the first voltage terminal VDD and the second capacitor C2 according to the first scan signal Scan1 transmitted by the first scan line SL1.

The driving current Ids is affected due to different degrees of loss in the signal transmission process (e.g., there is a voltage drop in the signal transmission process). Therefore, in order to compensate the attenuation of the driving current Ids caused by the voltage drop, the pixel driving circuit further includes a fifth transistor T5. The source and the drain of the fifth transistor T5 are electrically connected between the second voltage terminal VSS and the second node B. The gate of the fifth transistor T5 is electrically connected to the fourth scan line SL4. The fifth transistor T5 is used for compensating the second voltage signal according to the fourth scan signal Scan4 transmitted by the fourth scan line SL4. Specifically, continue to refer to FIG. 1A and FIG. 1B, one of the source and the drain of the fifth transistor T5 is electrically connected to the second voltage terminal VSS. The other one of the source and the drain of the fifth transistor T5 is electrically connected to the one of the source and the drain of the first transistor T1 that is electrically connected to the first capacitor C1. The fifth transistor T5 transmits the second voltage signal provided by the second voltage terminal VSS to the second node B according to the fourth scan signal Scan4 transmitted by the fourth scan line SL4. This causes the potential at the first node A to vary due to capacitive coupling, so that the voltage difference between the first node A and the second node B is irrelevant to the second voltage signal. This achieves compensation for the second voltage signal, which in turn achieves compensation for the influence of the voltage drop on the drive current Ids.

Optionally, the fourth transistor T4 is further configured to disconnect the electrical connection between the first voltage terminal VDD and the second capacitor C2 when the fifth transistor T5 compensates the second voltage signal. That is, the fourth transistor T4 is turned off when the fifth transistor T5 compensates the second voltage signal. This enables the second voltage signal provided by the second voltage terminal VSS to be directly compensated through the fifth transistor T5, reducing the complexity of the pixel driving circuit.

Continue to refer to FIG. 1A and FIG. 1B, the pixel driving circuit further includes a sixth transistor T6. The source and the drain of the sixth transistor T6 are electrically connected between the first voltage terminal VDD and the first node A. The gate of the sixth transistor T6 is electrically connected to the third scan line SL3. Specifically, one of the source and the drain of the sixth transistor T6 is electrically connected to the first voltage terminal VDD. The other one of the source and the drain of the sixth transistor T6 is electrically connected to the gate of the first transistor T1. The sixth transistor T6 is configured to transmit the first voltage signal provided by the first voltage terminal VDD to the first node A according to the third scan signal Scan3 transmitted from the third scan line SL3. The gate voltage of the first transistor T1 is initialized by the sixth transistor T6 and the first voltage signal.

Continue to refer to FIG. 1A and FIG. 1B, the pixel driving circuit further includes a seventh transistor T7. The source and the drain of the seventh transistor T7 are electrically connected between the light-emitting device D and the third node C. The gate of the seventh transistor T7 is electrically connected to the emission line EML. Specifically, one of the source and the drain of the seventh transistor T7 is electrically connected to the cathode of the light-emitting device D. The other one of the source and the drain of the seventh transistor T7 is electrically connected to one of the source and the drain of the first transistor T1. The seventh transistor T7 switches between an on state and an off state according to the emission control signal EM transmitted by the emission line EML. The seventh transistor T7 is turned on, so that the first transistor T1 generates a driving current Ids for driving the light emitting device D to emit light under the action of the first voltage terminal VDD, the second voltage terminal VSS, and the data signal Data.

Optionally, continue to refer to FIG. 1B, the pixel circuit further includes an eighth transistor T8. The source and the drain of the eighth transistor T8 are electrically connected between the second voltage terminal VSS and the second node B. The gate of the eighth transistor T8 is electrically connected to the emission line EML. Specifically, one of the source and the drain of the eighth transistor T8 is electrically connected to the other of the source and the drain of the first transistor T1. The other of the source and the drain of the eighth transistor T8 is electrically connected to the second voltage terminal VSS. The eighth transistor T8 and the seventh transistor T7 are used for switching between an on state and an off state according to the emission control signal EM transmitted by the emission line EML. The seventh transistor T7 and the eighth transistor T8 are turned on so that the first transistor T1 generates a driving current for driving the light-emitting device D to emit light under the action of the first voltage terminal VDD, the second voltage terminal VSS, and the data signal Data.

It can be understood that the first transistor T1 to the eighth transistor T8 may include at least one of a P-type transistor or an N-type transistor. The active layers of the first to eighth transistors T1 to T8 may include at least one of a silicon semiconductor layer or an oxide semiconductor layer. Optionally, the silicon semiconductor layer includes materials such as single crystal silicon, polycrystalline silicon, and amorphous silicon. The oxide semiconductor layer includes at least one of zinc oxide, zinc tin oxide, zinc indium oxide, indium oxide, titanium oxide, indium gallium zinc oxide, indium zinc tin oxide, and other materials.

Figure 2A:
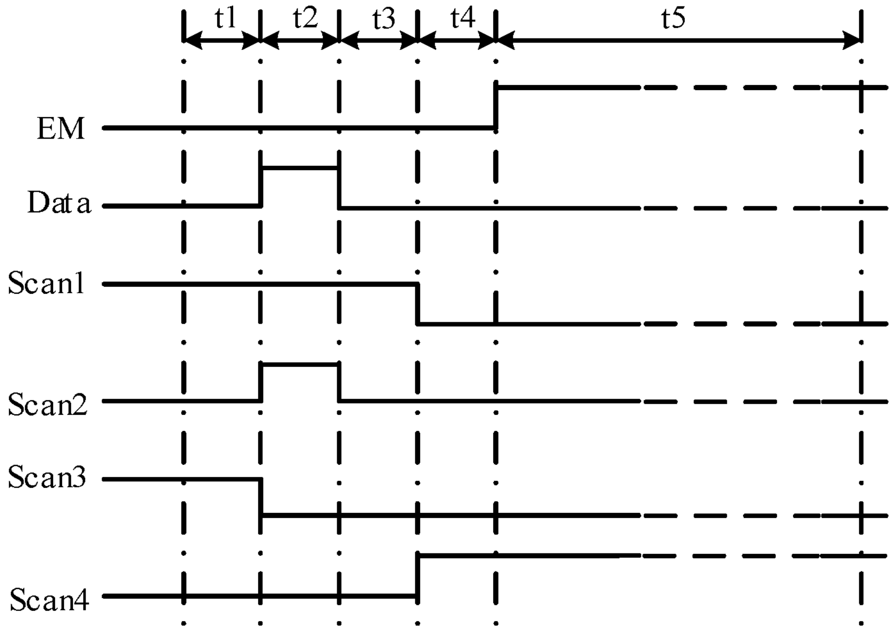
FIG. 2A is a timing diagram corresponding to the pixel driving circuit shown in FIG. 1A according to an embodiment of the present application.
Figure 2B:
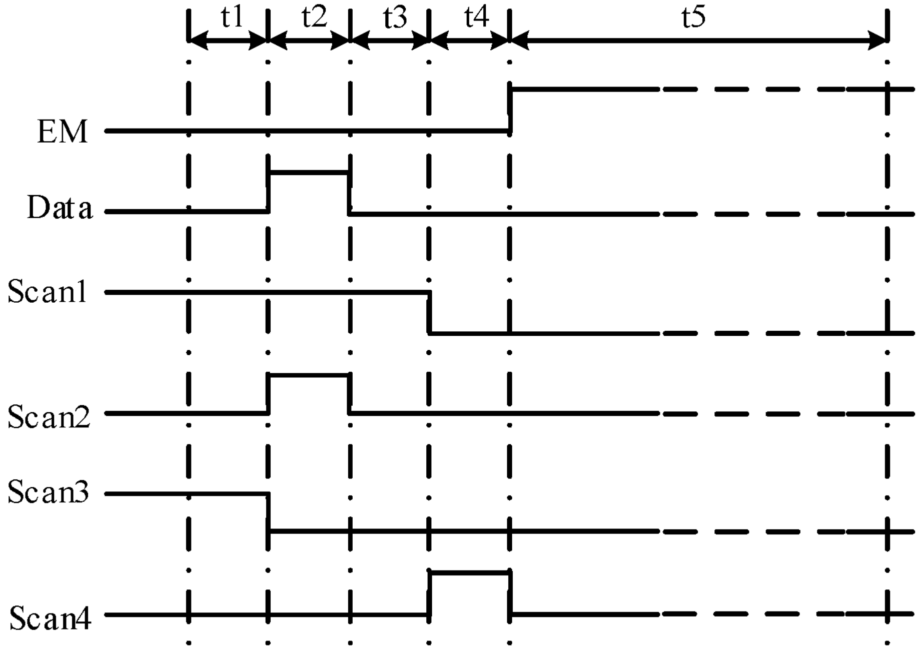
FIG. 2B is a timing diagram corresponding to the pixel driving circuit shown in FIG. 1B provided by an embodiment of the present application.

The present application also provides a driving method for a pixel driving circuit, which is used for driving any of the above pixel driving circuits. Specifically, FIG. 2A is a timing diagram corresponding to the pixel driving circuit shown in FIG. 1A provided by an embodiment of the present application. FIG. 2B is a timing diagram corresponding to the pixel driving circuit shown in FIG. 1B provided by an embodiment of the present application. Taking the example that the first transistor T1 to the eighth transistor T8 are all N-type transistors, the driving method of the pixel driving circuit will be described.

The driving method of the pixel driving circuit includes an initialization phase t1, a threshold voltage detection and data writing phase t2, a transition phase t3, a power voltage writing phase t4, and a light-emitting phase t5.

Initialization stage t1: The emission control signal EM transmitted by the transmission line EML is at a low level, and the data signal Data transmitted by the data line DL is Data_L. The first scan signal Scan1 transmitted by the first scan line SL1 is at a high level, and the second scan signal Scan2 transmitted by the second scan line SL2 is at a low level. The third scan signal Scan3 transmitted by the third scan line SL3 is at a high level, and the fourth scan signal Scan4 transmitted by the fourth scan line SL4 is at a low level. The second transistor T2 is turned off in response to the second scan signal Scan2, and the fifth transistor T5 is turned off in response to the fourth scan signal Scan4. The seventh transistor T7 (shown in FIG. 1A and FIG. 2A) or the seventh transistor T7 and the eighth transistor T8 (shown in FIG. 1B and FIG. 2B) are turned off in response to the emission control signal EM. The third transistor T3 and the fourth transistor T4 are turned on in response to the first scan signal Scan1. The sixth transistor T6 is turned on in response to the third scan signal Scan3. The third transistor T3 and the fourth transistor T4 are turned on so that the data signal Data_L is transmitted to the second node B, and the potential at the second node B becomes Data_L. The sixth transistor T6 is turned on so that the first voltage signal provided by the first voltage terminal VDD is transmitted to the first node A. The potential at the first node A becomes the voltage value Vdd corresponding to the first voltage signal. That is, the gate potential of the first transistor T1 is initialized through the sixth transistor T6 by using the first voltage signal provided by the first voltage terminal VDD. The voltage difference across the first capacitor C1 is Vdd−Data_L. Because the sixth transistor T6 is turned on, the two ends of the second capacitor C2 are short-circuited, and the voltage difference between the two ends of the second capacitor C2 is zero.

Threshold voltage detection and data writing stage t2: The emission control signal EM transmitted by the emission line EML is at a low level, and the data signal Data transmitted by the data line DL is Data_H. The first scan signal Scan1 transmitted by the first scan line SL1 is at a high level, and the second scan signal Scan2 transmitted by the second scan line SL2 is at a high level. The third scan signal Scan3 transmitted by the third scan line SL3 is at a low level, and the fourth scan signal Scan4 transmitted by the fourth scan line SL4 is at a low level. The fifth transistor T5 is turned off in response to the fourth scan signal Scan4, and the sixth transistor T6 is turned off in response to the third scan signal Scan3. The seventh transistor T7 (shown in FIG. 1A and FIG. 2A) or the seventh transistor T7 and the eighth transistor T8 (shown in FIG. 1B and FIG. 2B) are turned off in response to the emission control signal EM. The second transistor T2 is turned on in response to the second scan signal Scan2. The third transistor T3 and the fourth transistor T4 are turned on in response to the first scan signal Scan1. The third transistor T3 and the fourth transistor T4 are turned on so that the data signal Data_H is transmitted to the second node B. The potential Data_L at the second node B changes from Data_H. The second transistor T2 is turned on so that the first transistor T1 is diode-connected, and the potential at the first node A changes from Vdd to Data_H+Vth. That is, the gate potential of the first transistor T1 changes from Vdd to Data_H+Vth. The voltage difference across the first capacitor C1 is Data_H−Data_H+Vth=Vth. The voltage difference across the second capacitor C2 is Vdd-Data_H−Vth. That is, the threshold voltage of the first transistor T1 is stored in the first capacitor C1. The data signal Data_H is stored in the second capacitor C2. Vth represents the threshold voltage of the first transistor T1.

Transition stage t3: The emission control signal EM transmitted by the emission line EML is at a low level. The data signal Data transmitted by the data line DL is Data_L. The first scan signal Scan1 transmitted by the first scan line SL1 is at a high level. The second scan signal Scan2 transmitted by the second scan line SL2 is at a low level. The third scan signal Scan3 transmitted by the third scan line SL3 is at a low level. The fourth scan signal Scan4 transmitted by the fourth scan line SL4 is at a low level. The second transistor T2 is turned off in response to the second scan signal Scan2. The fifth transistor T5 is turned off in response to the fourth scan signal Scan4. The sixth transistor T6 is turned off in response to the third scan signal Scan3. The seventh transistor T7 (shown in FIG. 1A and FIG. 2A) or the seventh transistor T7 and the eighth transistor T8 (shown in FIG. 1B and FIG. 2B) are turned off in response to the emission control signal EM. The third transistor T3 and the fourth transistor T4 are turned on in response to the first scan signal Scan1. The third transistor T3 and the fourth transistor T4 are turned on so that the data signal Data_L is transmitted to the second node B. The potential at the second node B changes from Data_H to Data_L. Due to the existence of the first capacitor C1, the potential at the first node A changes from Data_H+Vth to Data_H+Vth+V0 due to capacitive coupling. That is, the gate potential of the first transistor T1 changes from Data_H+Vth to Data_H+Vth+V0. The voltage difference across the first capacitor C1 is Data_H+Vth+V0−Data_L. The voltage difference across the second capacitor C2 is Vdd−Data_H−Vth−V0. V0=(Data_H−Data_L)*C1/(C1+C2).

Power supply voltage writing stage t4: the emission control signal EM transmitted by the emission line EML is at a low level, and the data signal Data transmitted by the data line DL is Data_L. The first scan signal Scan1 transmitted by the first scan line SL1 is at a low level. The second scan signal Scan2 transmitted by the second scan line SL2 is at a low level. The third scan signal Scan3 transmitted by the third scan line SL3 is at a low level. The fourth scan signal Scan4 transmitted by the fourth scan line SL4 is at a high level. The second transistor T2 is turned off in response to the second scan signal Scan2. The third transistor T3 and the fourth transistor T4 are turned off in response to the first scan signal Scan1. The sixth transistor T6 is turned off in response to the third scan signal Scan3. The seventh transistor T7 (shown in FIG. 1A and FIG. 2A) or the seventh transistor T7 and the eighth transistor T8 (shown in FIG. 1B and FIG. 2B) are turned off in response to the emission control signal EM. The fifth transistor T5 is turned on in response to the fourth scan signal Scan4. The second voltage signal provided by the second voltage terminal VSS is transmitted to the second node B. The potential at the second node B changes from Data_L to a voltage value Vss corresponding to the second voltage signal. Due to the existence of the first capacitor C1, the potential at the first node A changes from Data_H+Vth+V0 to Data_H+Vth+V0+Vss−Data_L due to capacitive coupling. That is, the gate potential of the first transistor T1 changes from Data_H+Vth+V0 to Data_H+Vth+V0+Vss−Data_L. The voltage difference across the first capacitor C1 is Data_H+Vth+V0+Vss−Data_L−Vss=Data_H+Vth+V0−Data_L. The voltage difference between the first node A and the second node B is irrelevant to the second voltage signal.

Light-emitting stage t5: the emission control signal EM transmitted by the emission line EML is at a high level, and the data signal Data transmitted by the data line DL is Data_L. The first scan signal Scan1 transmitted by the first scan line SL1 is at a low level. The second scan signal Scan2 transmitted by the second scan line SL2 is at a low level. The third scan signal Scan3 transmitted by the third scan line SL3 is at a low level. The second transistor T2 is turned off in response to the second scan signal Scan2. The third transistor T3 and the fourth transistor T4 are turned off in response to the first scan signal Scan1. The sixth transistor T6 is turned off in response to the third scan signal Scan3. When the fourth scan signal Scan4 transmitted by the fourth scan line SL4 is at a high level (as shown in FIG. 1A and FIG. 2A), the fifth transistor T5 is turned on in response to the fourth scan signal Scan4. The seventh transistor T7 is turned on in response to the emission control signal EM. The first transistor T1 generates the driving current Ids for driving the light emitting device D to emit light. When the fourth scan signal Scan4 transmitted by the fourth scan line SL4 is at a low level (as shown in FIG. 1B and FIG. 2B), the fifth transistor T5 is turned off in response to the fourth scan signal Scan4. The seventh transistor T7 and the eighth transistor T8 are turned on in response to the emission control signal EM. The first transistor T1 generates the driving current Ids for driving the light emitting device D to emit light.

Because Vgs=Data_H+Vth+V0+Vss−Data_L−Vss=Data_H+Vth+V0−Data_L, the driving current Ids=(CoxμmW/L)*(Vgs−Vth)2/2. Cox, m, W, and L are the channel capacitance per unit area, channel mobility, channel width and channel length of the transistor, respectively. The driving current Ids=(CoxμmW/L)*(Vgs−Vth)2/2=(CoxμmW/L)*(Data_H+V0−Data_L)2/2. Therefore, the driving current Ids is not affected by the change of the threshold voltage of the first transistor T1 and the second voltage signal transmitted by the second voltage terminal VSS, so as to ensure the stability of the light-emitting device D to emit light.

Compared with the pixel driving circuit shown in FIG. 1B, the pixel driving circuit shown in FIG. 1A uses fewer transistors, which is beneficial to save layout space and manufacturing cost.

Embodiments of the present application also provide a display panel, where the display panel includes any of the above-mentioned pixel driving circuits.

Figure 3:
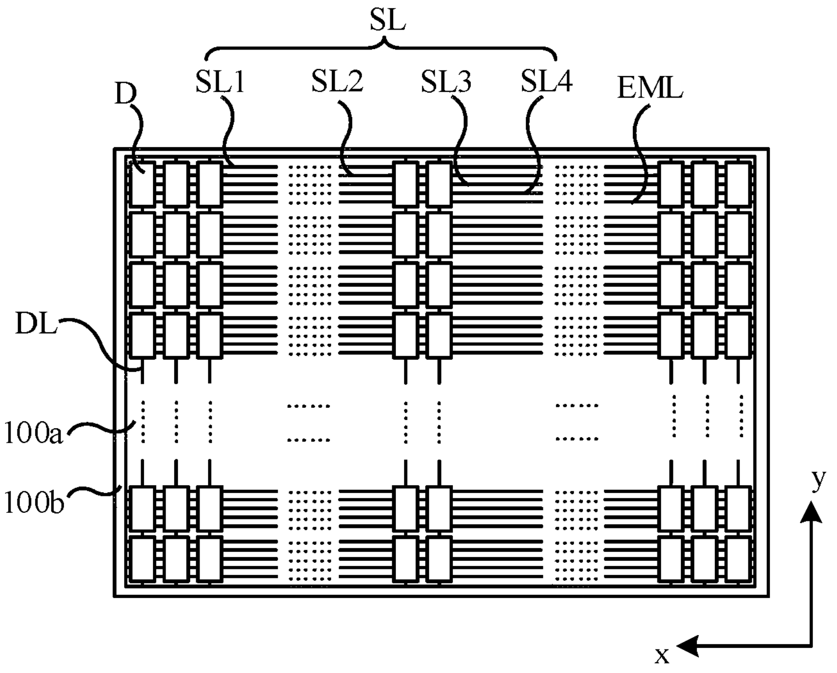
FIG. 3 is a schematic structural diagram of a display panel provided by an embodiment of the present application.

FIG. 3 is a schematic structural diagram of a display panel provided by an embodiment of the present application. Embodiments of the present application also provide a display panel. The display panel includes a driving circuit. Optionally, the display panel includes a passive light-emitting display panel and a self-emitting display panel. The driving circuit includes a backlight driving circuit and a pixel driving circuit. In this application, the driving circuit is taken as an example of a pixel driving circuit for description.

The display panel includes a display area 100*a* and a non-display area 100*b*. The display panel implements a display function in the display area 100*a*. Optionally, the non-display area 100*b* is located at the periphery of the display area 100*a*. Optionally, the display panel may further include a sensing area. The sensing area may be located in the display area 100*a* or in the non-display area 100*b*. The display panel includes sensing elements disposed corresponding to the sensing regions. Optionally, the sensing element includes a camera, a fingerprint sensor, a distance sensor, and the like.

The display panel includes a plurality of scan lines SL, a plurality of data lines DL, a plurality of emission lines EML, and a plurality of the pixel driving circuits.

A plurality of the data lines DL transmit a plurality of data signals. Optionally, a plurality of the data lines DL are arranged along the first direction x and extend along the second direction y in the display area 100*a*. The first direction x and the second direction y intersect.

A plurality of the scan lines SL transmit a plurality of scan signals. Optionally, a plurality of the scan lines SL are arranged in the display area 100*a* along the second direction y and extend along the first direction x.

A plurality of the emission lines EML transmit a plurality of emission control signals. Optionally, a plurality of the emission lines EML are arranged in the display area 100*a* along the second direction y and extend along the first direction x.

The plurality of pixel driving circuits are electrically connected to the plurality of the scan lines SL, the plurality of the data lines DL, and the plurality of the emission lines EML. The display panel is displayed according to the corresponding scan signal, the data signal, and the emission control signal. Optionally, a plurality of the pixel driving circuits are located in the display area 100*a*.

The display panel further includes a driving module. The driving module is electrically connected with the pixel driving circuit. Optionally, the driving module includes a power supply electrically connected to the first voltage terminal VDD of the pixel driving circuit. Optionally, the driving module further includes a gate driving chip and a source driving chip. The gate driving chip is electrically connected to the plurality of scan lines SL, so as to provide scan signals for the plurality of scan lines SL. The source driver chip is electrically connected to the plurality of data lines DL, so as to transmit data signals for the plurality of data lines DL. Optionally, the driving module further includes an emission control chip. The emission control chip is electrically connected to a plurality of the emission lines EML, so as to provide emission control signals for the plurality of the emission lines EML.

Figure 4A:
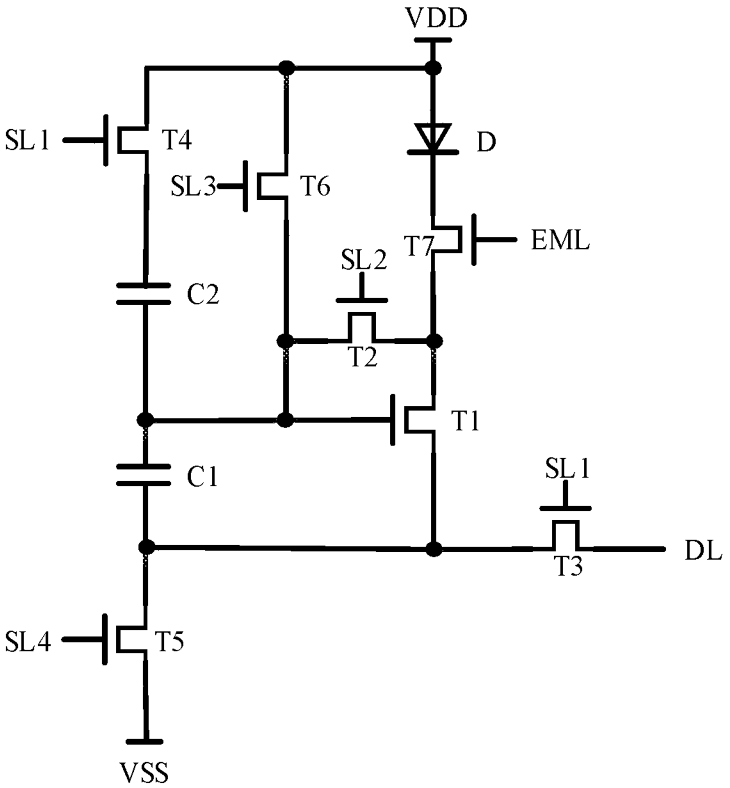
FIG. 4A and FIG. 4B are schematic structural diagrams of a pixel driving circuit provided by an embodiment of the present application.
Figure 4B:
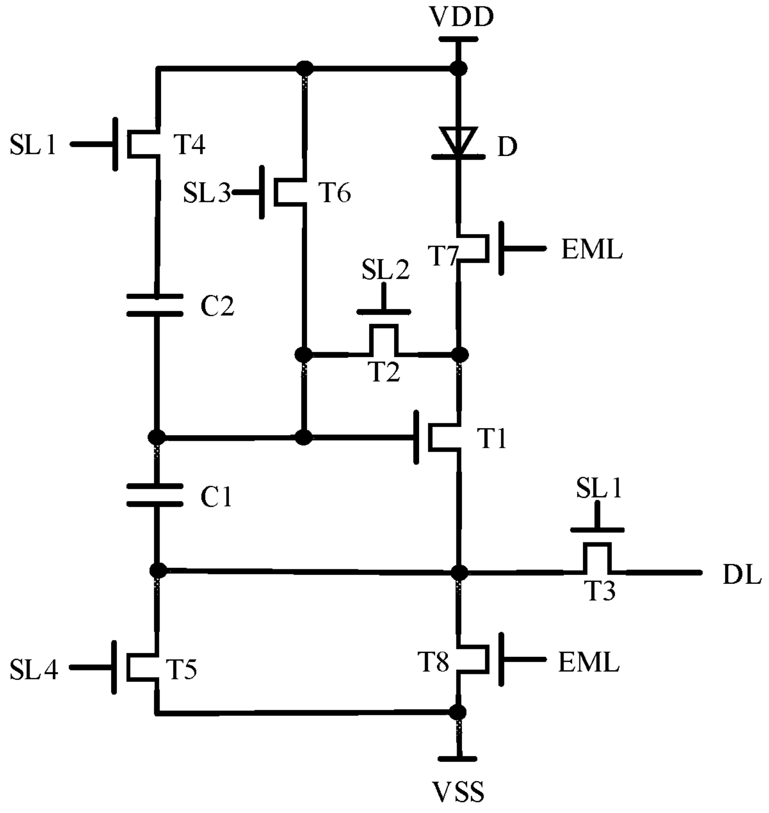

FIG. 4A and FIG. 4B are schematic structural diagrams of a pixel driving circuit provided by an embodiment of the present application. In order to realize the display function of the display panel, each of the pixel driving circuits includes at least a first transistor T1 and a light-emitting device D. The first transistor T1 is used for generating a driving current for driving the light emitting device D to emit light according to the data signal, so that the light emitting device D emits light.

Optionally, the light-emitting device D is connected in series between the first voltage terminal VDD and one of the source and the drain of the first transistor T1. Or, the light-emitting device D is connected in series between the second voltage terminal VSS and the other one of the source and the drain of the first transistor T1.

Optionally, in order to reduce the power consumption of the display panel, the light-emitting device D is connected in series between the first voltage terminal VDD and one of the source and the drain of the first transistor T1. This makes the light-emitting device D closer to the first voltage terminal VDD, which is beneficial to reducing the voltage amplitude corresponding to each transistor in the pixel driving circuit.

Optionally, the light-emitting device D includes an organic light-emitting diode, a sub-millimeter light-emitting diode, a miniature light-emitting diode, and the like. Optionally, the light-emitting layer of the light-emitting device may include a perovskite material, a fluorescent material, a quantum dot material, or the like.

Continue to refer to FIG. 4A and FIG. 4B, the pixel driving circuit further includes a second transistor T2, a first capacitor C1, and a second capacitor C2.

The first capacitor C1 is connected in series between the gate of the first transistor T1 and one of the source and the drain of the first transistor T1 that is electrically connected to the second voltage terminal VSS. The second capacitor C2 is connected in series between the gate of the first transistor T1 and the first voltage terminal VDD.

The source and the drain of the second transistor T2 are electrically connected between the gate of the first transistor T1 and one of the source and the drain of the first transistor T1 that is electrically connected to the light-emitting device D. The gate of the second transistor T2 is electrically connected to the corresponding scan line SL. Specifically, the gate of the second transistor T2 is electrically connected to the second scan line SL2. One of the source and drain of the second transistor T2 is electrically connected to the gate of the first transistor T1. The other one of the source electrode and the drain electrode of the second transistor T2 is electrically connected to the one of the source electrode and the drain electrode of the first transistor T1 that is electrically connected to the light emitting device D. The second transistor T2 is configured to store the threshold voltage of the first transistor T1 in the first capacitor C1 according to the second scan signal transmitted by the second scan line SL2. The data signal is stored in the second capacitor C2 to compensate the influence of the threshold voltage on the driving current when the first transistor T1 drives the light-emitting device D to emit light. Therefore, the attenuation of the driving current flowing through the light-emitting device D caused by the shift of the threshold voltage of the first transistor T1 is improved, and the display performance of the display panel is improved.

In order to realize the writing of the data signal, the pixel driving circuit further includes a third transistor T3. The gate of the third transistor T3 is electrically connected to the corresponding scan line SL. The source and the drain of the third transistor T3 are electrically connected between the corresponding data line DL and one of the source and the drain of the first transistor T1 that is electrically connected to the first capacitor C1. Specifically, the gate of the third transistor T3 is electrically connected to the first scan line SL1. One of the source and the drain of the third transistor T3 is electrically connected to the corresponding data line DL. The other of the source and the drain of the third transistor is electrically connected to the one of the source and the drain of the first transistor T1 that is electrically connected to the first capacitor C1. The third transistor T3 is configured to transmit the data signal Data transmitted by the data line DL to one of the source and the drain of the first transistor electrically connected to the first capacitor C1 according to the first scan signal transmitted by the first scan line SL1.

Optionally, in order to realize the controllable electrical connection between the second capacitor C2 and the first voltage terminal VDD, the pixel driving circuit further includes a fourth transistor T4. The gate of the fourth transistor T4 is electrically connected to the corresponding scan line SL. The source and the drain of the fourth transistor T4 are electrically connected between the second capacitor C2 and the first voltage terminal VDD. Optionally, gates of the third transistor T3 and the fourth transistor T4 are electrically connected to the same scan line SL. The third transistor T3 and the fourth transistor T4 are both P-type transistors or are both N-type transistors. When the third transistor T3 is turned on, the fourth transistor T4 is also turned on. This ensures efficient writing of the data signal and efficient detection of the threshold voltage of the first transistor T1. Specifically, the gate of the fourth transistor T4 is electrically connected to the first scan line SL1. One of the source and the drain of the fourth transistor T4 is electrically connected to the second capacitor C2. The other of the source and the drain of the fourth transistor T4 is electrically connected to the first voltage terminal VDD.

During the signal transmission process, there will be loss (such as a voltage drop during the signal transmission process), so that the driving current for driving the light-emitting devices D in various places in the display panel to emit light is different, resulting in uneven display of the display panel. The pixel driving circuit further includes a fifth transistor T5. The gate of the fifth transistor T5 is electrically connected to the corresponding scan line SL. The source and the drain of the fifth transistor T5 are electrically connected between the second voltage terminal VSS and one of the source and the drain of the first transistor T1 that is electrically connected to the first capacitor C1. Specifically, the gate of the fifth transistor T5 is electrically connected to the fourth scan line SL4. One of the source and the drain of the fifth transistor T5 is electrically connected to the second voltage terminal VSS. The other of the source and the drain of the fifth transistor T5 is electrically connected to the one of the source and the drain of the first transistor T1 that is electrically connected to the first capacitor C1. The fifth transistor T5 is configured to transmit the second voltage signal provided by the second voltage terminal VSS to one of the source and the drain of the first transistor T1 that is electrically connected to the first capacitor C1 according to the fourth scan signal transmitted by the fourth scan line SL4, so as to compensate the influence of the voltage drop on the driving current through the second voltage signal.

To ensure that the first transistor T1 can generate an accurate driving current every time the light-emitting device D emits light, the pixel driving circuit further includes a sixth transistor T6. The gate of the sixth transistor T6 is electrically connected to the corresponding scan line SL. The source and the drain of the sixth transistor T6 are electrically connected between the first voltage terminal VDD and the gate of the first transistor T1. Specifically, the gate of the sixth transistor T6 is electrically connected to the third scan line SL3. One of the source and the drain of the sixth transistor T6 is electrically connected to the first voltage terminal VDD. The other of the source and the drain of the sixth transistor T6 is electrically connected to the gate of the first transistor T1. The sixth transistor T6 is configured to transmit the first voltage signal provided by the first voltage terminal VDD to the gate of the first transistor T1 according to the third scan signal transmitted by the third scan line SL3, such that the gate voltage of the first transistor T1 is initialized by the first voltage signal.

In order to realize the controllability of the light-emitting stage of the light-emitting device D, the pixel driving circuit further includes a seventh transistor T7. The gate of the seventh transistor T7 is electrically connected to the corresponding emission line EML. The source and the drain of the seventh transistor T7 are electrically connected between the light-emitting device D and one of the source and the drain of the first transistor T1. Specifically, one of the source and the drain of the seventh transistor T7 is electrically connected to the cathode of the light-emitting device D. The other of the source and the drain of the seventh transistor T7 is electrically connected to one of the source and the drain of the first transistor T1. The seventh transistor T7 is configured to cause the first transistor T1 to generate a driving current for driving the light-emitting device D to emit light according to the emission control signal transmitted by the emission line EML.

Optionally, the fifth transistor T5 may be turned on when the seventh transistor T7 responds to the emission control signal. This enables the first transistor T1 to generate a driving current between the first voltage terminal VDD and the second voltage terminal VSS for driving the light emitting device D to emit light.

Optionally, the pixel driving circuit further includes an eighth transistor T8. The gate of the eighth transistor T8 is electrically connected to the emission line EML. The source and the drain of the eighth transistor are electrically connected between the second voltage terminal VSS and the other of the source and the drain of the first transistor T1. Specifically, one of the source and the drain of the eighth transistor T8 is electrically connected to the other of the source and the drain of the first transistor T1. The other of the source and the drain of the eighth transistor T8 is electrically connected to the second voltage terminal VSS. The eighth transistor T8 and the seventh transistor T7 are used for causing the first transistor T1 to generate a driving current for driving the light-emitting device D to emit light between the first voltage terminal VDD and the second voltage terminal VSS according to an emission control signal transmitted by the emission line EML.

In the Nth frame period, the driving method of the pixel driving circuit includes an initialization phase, a threshold voltage detection and data writing phase, a transition phase, a power supply voltage writing phase, and a light-emitting phase.

In the initialization phase, the emission control signal transmitted by the emission line EML is at a low level. The data signal Data transmitted by the data line DL is Data_L. The first scan signal transmitted by the first scan line SL1 is at a high level. The second scan signal transmitted by the second scan line SL2 is at a low level. The third scan signal transmitted by the third scan line SL3 is at a high level. The fourth scan signal transmitted by the fourth scan line SL4 is at a low level. The second transistor T2, the fifth transistor T5, and the seventh transistor T7 (as shown in FIG. 4A) or the seventh transistor T7 and the eighth transistor T8 (as shown in FIG. 4B) are turned off. The third transistor T3, the fourth transistor T4, and the sixth transistor T6 are turned on. The data signal Data_L is transmitted to one of the source and the drain of the first transistor T1 that is electrically connected to the first capacitor C1. The first voltage signal provided by the first voltage terminal VDD is transmitted to the gate of the first transistor T1 to realize the initialization of the potential of the gate of the first transistor T1.

In the threshold voltage detection and data writing stage, the data signal Data transmitted by the data line DL is Data_H. The first scan signal and the second scan signal are at a high level. The third scan signal, the fourth scan signal, and the emission control signal are at a low level. The fifth transistor T5, the sixth transistor T6, and the seventh transistor T7 (as shown in FIG. 4A) or the seventh transistor T7 and the eighth transistor T8 (as shown in FIG. 4B) are turned off. The second transistor T2, the third transistor T3, and the fourth transistor T4 are turned on. The data signal Data_H is transmitted to one of the source and the drain of the first transistor T1 that is electrically connected to the first capacitor C1. The second transistor T2 is turned on so that the first transistor T1 is diode-connected. The gate potential of the first transistor T1 changes from Vdd to Data_H+Vth. The threshold voltage of the first transistor T1 is stored in the first capacitor C1, and the data signal Data_H is stored in the second capacitor C2. Vth represents the threshold voltage of the first transistor T1.

In the transition phase, the data signal Data transmitted by the data line DL is Data_L. The first scan signal is at a high level. The second scan signal, the third scan signal, the fourth scan signal, and the emission control signal are at a low level. The second transistor, the fifth transistor T5, the sixth transistor T6, and the seventh transistor T7 (as shown in FIG. 4A) or the seventh transistor T7 and the eighth transistor T8 (as shown in FIG. 4B) are turned off. The third transistor T3 and the fourth transistor T4 are turned on. The data signal Data_L is transmitted to one of the source and the drain of the first transistor T1 that is electrically connected to the first capacitor C1. The gate potential of the first transistor T1 changes from Data_H+Vth to Data_H+Vth+V0 due to capacitive coupling. V0=(Data_H−Data_L)*C1/(C1+C2).

In the power supply voltage writing stage, the data signal Data transmitted by the data line DL is Data_L. The first scan signal, the second scan signal, the third scan signal, and the emission control signal are at a low level. The fourth scan signal is at a high level. The second transistor T2, the third transistor T3, the fourth transistor T4, the sixth transistor T6, and the seventh transistor T7 (as shown in FIG. 4A) or the seventh transistor T7 and the eighth transistor T8 (as shown in FIG. 4B) are turned off. The fifth transistor T5 is turned on. The second voltage signal provided by the second voltage terminal VSS is transmitted to one of the source and the drain of the first transistor T1 that is electrically connected to the first capacitor C1. The gate potential of the first transistor T1 changes from Data_H+Vth+V0 to Data_H+Vth+V0+Vss−Data_L due to capacitive coupling.

In the light-emitting stage, the data signal Data transmitted by the data line DL is Data_L. The transmit control signal is at a high level. The first scan signal, the second scan signal, and the third scan signal are at a low level. The second transistor T2, the third transistor T3, the fourth transistor T4, and the sixth transistor T6 are turned off. If the fourth scan signal is at a high level (as shown in FIG. 4A), the fifth transistor T5 is turned on. The seventh transistor T7 is turned on in response to the emission control signal. The first transistor T1 generates the driving current for driving the light emitting device D to emit light. When the fourth scan signal is at a low level (as shown in FIG. 4B), the fifth transistor T5 is turned off. The seventh transistor T7 and the eighth transistor T8 are turned on, and the first transistor T1 generates the driving current for driving the light-emitting device D to emit light.

The present application further provides a display device comprising any of the above-mentioned driving circuits or any of the above-mentioned display panels.

Understandably, the display device includes a movable display device (such as a notebook computer, a mobile phone, etc.), a fixed terminal (such as a desktop computer, a TV, etc.), a measurement device (such as a sports bracelet, a thermometer, etc.), and the like.

Specific examples are used herein to illustrate the principles and implementations of the present application. The descriptions of the above embodiments are only used to help understand the method and the core idea of the present application. In addition, for those skilled in the art, according to the idea of the present application, there will be changes in the specific embodiments and application scope. In conclusion, the content of this specification should not be construed as a limitation on the present application.

What is claimed is:

1. A pixel drive circuit, comprising:

a first transistor, wherein a gate of the first transistor is electrically connected to a first node, one of a source and a drain of the first transistor is electrically connected to a second node, and another of the source and the drain of the first transistor is electrically connected to a third node;

a second transistor, wherein a source and a drain of the second transistor are electrically connected between the first node and the third node, a gate of the second transistor is electrically connected to a second scan line and is used to detect a threshold voltage of the first transistor according to a second scan signal;

a first capacitor connected in series between the first node and the second node;

a second capacitor connected in series between the first node and a first voltage terminal;

a light-emitting device electrically connected between the first voltage terminal and the third node; and a fifth transistor, wherein a source and a drain of the fifth transistor are electrically connected between a second voltage terminal and the second node, and a gate of the fifth transistor is electrically connected to a fourth scan line and is used to compensate a second voltage signal according to a fourth scan signal;

wherein the pixel drive circuit further comprises: a fourth transistor, wherein a source and a drain of the fourth transistor are electrically connected between the second capacitor and the first voltage terminal, and a gate of the fourth transistor is electrically connected to a first scan line and is used to disconnect an electrical connection between the first voltage terminal and the second capacitor when the fifth transistor compensates the second voltage signal.

2. The pixel drive circuit of claim 1, further comprising:

a third transistor, wherein a source and a drain of the third transistor are electrically connected between a data line and the second node, and a gate of the third transistor is electrically connected to the first scan line and is used to transmit a data signal to the second node according to a first scan signal.

3. The pixel drive circuit of claim 1, further comprising:

a sixth transistor, wherein a source and a drain of the sixth transistor are electrically connected between the first voltage terminal and the first node, and a gate of the sixth transistor is electrically connected to a third scan line and is used to initialize a potential of the first node according to a third scan signal.

4. The pixel drive circuit of claim 1, further comprising:

a seventh transistor, wherein a source and a drain of the seventh transistor are electrically connected between the light-emitting device and the third node, and a gate of the seventh transistor is electrically connected to an emission line.

5. The pixel drive circuit of claim 4, further comprising:

an eighth transistor, wherein a source and a drain of the eighth transistor are electrically connected between the second voltage terminal and the second node, and a gate of the eighth transistor is electrically connected to the emission line.

6. The pixel drive circuit of claim 1, wherein a capacitance of the first capacitor is less than or equal to a capacitance of the second capacitor.

7. The pixel drive circuit of claim 1, wherein the light-emitting device comprises an organic light-emitting diode, a sub-millimeter light-emitting diode, or a micro light-emitting diode.

8. The pixel drive circuit of claim 1, wherein the third transistor and the fourth transistor are both P-type transistors or are both N-type transistors.

9. A driving method of a pixel driving circuit, used to drive the pixel driving circuit as claimed in claim 1, the driving method comprises:

a threshold voltage detection and data writing stage: wherein the second transistor is turned on in response to the second scan signal, such that the first transistor is diode-connected; and a power supply voltage writing stage: wherein the fifth transistor is turned on in response to the fourth scan signal, and the second voltage signal provided by the second voltage terminal is transmitted to the second node.

10. A display panel, comprising a power supply and a pixel driving circuit, wherein the pixel driving circuit comprises:

a first transistor, wherein a gate of the first transistor is electrically connected to a first node, one of a source and a drain of the first transistor is electrically connected to a second node, and another of the source and the drain of the first transistor is electrically connected to a third node;

a second transistor, wherein a source and a drain of the second transistor are electrically connected between the first node and the third node, a gate of the second transistor is electrically connected to a second scan line and is used to detect a threshold voltage of the first transistor according to a second scan signal;

a first capacitor connected in series between the first node and the second node;

a second capacitor connected in series between the first node and a first voltage terminal;

a light-emitting device electrically connected between the first voltage terminal and the third node; and a fifth transistor, wherein a source and a drain of the fifth transistor are electrically connected between a second voltage terminal and the second node, and a gate of the fifth transistor is electrically connected to a fourth scan line and is used to compensate a second voltage signal according to a fourth scan signal;

wherein the power supply is electrically connected to the first voltage terminal of the pixel driving circuit; and wherein the pixel drive circuit further comprises: a fourth transistor, wherein a source and a drain of the fourth transistor are electrically connected between the second capacitor and the first voltage terminal, and a gate of the fourth transistor is electrically connected to a first scan line and is used to disconnect an electrical connection between the first voltage terminal and the second capacitor when the fifth transistor compensates the second voltage signal.

11. The display panel of claim 10, wherein the pixel driving circuit further comprises:

a third transistor, wherein a source and a drain of the third transistor are electrically connected between a data line and the second node, and a gate of the third transistor is electrically connected to the first scan line and is used to transmit a data signal to the second node according to a first scan signal.

12. The display panel of claim 10, wherein the pixel driving circuit further comprises:

a sixth transistor, wherein a source and a drain of the sixth transistor are electrically connected between the first voltage terminal and the first node, and a gate of the sixth transistor is electrically connected to a third scan line and is used to initialize a potential of the first node according to a third scan signal.

13. The display panel of claim 10, wherein the pixel driving circuit further comprises:

a seventh transistor, wherein a source and a drain of the seventh transistor are electrically connected between the light-emitting device and the third node, and a gate of the seventh transistor is electrically connected to an emission line.

14. The display panel of claim 13, wherein the pixel driving circuit further comprises:

an eighth transistor, wherein a source and a drain of the eighth transistor are electrically connected between the second voltage terminal and the second node, and a gate of the eighth transistor is electrically connected to the emission line.

15. The display panel of claim 10, wherein a capacitance of the first capacitor is less than or equal to a capacitance of the second capacitor.

16. The display panel of claim 10, wherein the light-emitting device comprises an organic light-emitting diode, a sub-millimeter light-emitting diode, or a micro light-emitting diode.

17. The display panel of claim 10, wherein the third transistor and the fourth transistor are both P-type transistors or are both N-type transistors.

18. The display panel of claim 10, wherein the display panel further comprises a gate driving chip, the gate driving chip is electrically connected to the gate of the second transistor through the second scan line and is electrically connected to the gate of the fifth transistor through the fourth scan line.

* * * * *